US010680695B2

(12) United States Patent
Davydov et al.

(10) Patent No.: US 10,680,695 B2
(45) Date of Patent: Jun. 9, 2020

(54) CODEBOOK DESIGN FOR BEAMFORMED CSI-RS FOR FD-MIMO

(71) Applicant: Intel IP Corporation, Santa Clara, CA (US)

(72) Inventors: Alexei Davydov, Nizhny Novgorod (RU); Yuan Zhu, Beijing (CN); Hong He, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 15/743,800

(22) PCT Filed: Dec. 24, 2015

(86) PCT No.: PCT/IB2015/002620
§ 371 (c)(1),
(2) Date: Jan. 11, 2018

(87) PCT Pub. No.: WO2017/025768
PCT Pub. Date: Feb. 16, 2017

(65) Prior Publication Data
US 2018/0205438 A1 Jul. 19, 2018

Related U.S. Application Data

(60) Provisional application No. 62/203,595, filed on Aug. 11, 2015.

(51) Int. Cl.
*H04W 4/00* (2018.01)
*H04B 7/06* (2006.01)
*H04B 7/0456* (2017.01)

(52) U.S. Cl.
CPC ........ *H04B 7/0626* (2013.01); *H04B 7/0469* (2013.01); *H04B 7/0639* (2013.01)

(58) Field of Classification Search
CPC ... H04B 7/0469; H04B 7/0626; H04B 7/0639
See application file for complete search history.

(56) References Cited

U.S. PATENT DOCUMENTS

| | | | |
|---|---|---|---|
| 2006/0072683 A1* | 4/2006 | Kent | H04B 7/0697 375/267 |
| 2010/0202502 A1* | 8/2010 | Tong | H04B 7/0619 375/224 |
| 2013/0083681 A1* | 4/2013 | Ebrahimi Tazeh Mahalleh | H04L 5/0057 370/252 |
| 2014/0098689 A1 | 4/2014 | Lee et al. | |
| 2014/0177683 A1 | 6/2014 | Krishnamurthy et al. | |

(Continued)

OTHER PUBLICATIONS

International Search Report and Written Opinion (dated Jun. 24, 2016), International App. No. PCT/IB2015/002620, 10 pages.

*Primary Examiner* — Minh Trang T Nguyen
(74) *Attorney, Agent, or Firm* — Eschweiler & Potashnik, LLC

(57) ABSTRACT

Codebook designs are disclosed for full-dimensional multiple-input-multiple output (FD-MIMO) wireless cellular systems. The FD-MIMO cookbooks employ channel state information reference signals (CSI-RS). The codebook designs are used in beamforming CSI-RSs by the enhanced nodeB (eNB), where the CSI-RS is sent to the user equipment (UE), enabling the UE to perform channel estimation. The codebooks support beam selection, co-phasing between polarizations, and beam combining.

24 Claims, 13 Drawing Sheets

(56) References Cited

U.S. PATENT DOCUMENTS

2014/0192918 A1  7/2014  Park et al.
2016/0156397 A1* 6/2016  Onggosanusi ....... H04B 7/0456

* cited by examiner

Figure 4

CODEBOOK (100) for FD-MIMO

| rank | precoding matrix |
|---|---|
| 1 | $\frac{1}{\sqrt{2}}\begin{bmatrix} e^m \\ e^{j\alpha}e^m \end{bmatrix}, \frac{1}{\sqrt{2}}\begin{bmatrix} e^m \\ -e^{j\alpha}e^m \end{bmatrix}, \{m\}=0,\ldots,N_p/2-1, \{\alpha\}=0,\pi/2$ |
| 2 | $\frac{1}{\sqrt{4}}\begin{bmatrix} e^m & e^m \\ e^{j\alpha}e^m & -e^{j\alpha}e^m \end{bmatrix}, \{m\}=0,\ldots,N_p/2-1, \{\alpha\}=0,\pi/2$ |
| 3 | $\frac{1}{\sqrt{6}}\begin{bmatrix} e^m & e^k \\ e^{j\alpha}e^m & e^{j\beta}e^k \\ -e^{j\alpha}e^m & e^{j\beta}e^k \end{bmatrix}$ $\frac{1}{\sqrt{6}}\begin{bmatrix} e^m & e^k & e^k \\ e^{j\alpha}e^m & e^{j\beta}e^k & -e^{j\beta}e^k \end{bmatrix}, \{m,k\}=0,\ldots,N_p/2-1, m\neq k, \{\alpha,\beta\}=0,\pi/2$ |
| 4 | $\frac{1}{\sqrt{8}}\begin{bmatrix} e^m & e^m & e^k & e^k \\ e^{j\alpha}e^m & -e^{j\alpha}e^m & e^{j\beta}e^k & -e^{j\beta}e^k \end{bmatrix}, \{m,k\}=0,\ldots,N_p/2-1, m\neq k, \{\alpha,\beta\}=0,\pi/2$ |

Figure 5

CODEBOOK (200) for FD-MIMO

| rank | precoding matrix |
|---|---|
| 1 | $\frac{1}{\sqrt{4}}\begin{bmatrix} \mathbf{d}^{m,n} \\ e^{j\alpha}\mathbf{d}^{m,n} \end{bmatrix}, \frac{1}{\sqrt{4}}\begin{bmatrix} \mathbf{d}^{m,n} \\ -e^{j\alpha}\mathbf{d}^{m,n} \end{bmatrix}; \{m,n\}=0,\ldots,N_p/2-1, m\neq n, \{\alpha\}=0,\pi/2$ |
| 2 | $\frac{1}{\sqrt{8}}\begin{bmatrix} \mathbf{d}^{m,n} & \mathbf{d}^{m,n} \\ e^{j\alpha}\mathbf{d}^{m,n} & -e^{j\alpha}\mathbf{d}^{m,n} \end{bmatrix}; \{m\}=0,\ldots,N_p/2-1, \{\alpha\}=0,\pi/2$ |
| 3 | $\frac{1}{\sqrt{12}}\begin{bmatrix} \mathbf{d}^{m,n} & \mathbf{d}^{m,n} & \mathbf{d}^{k,l} \\ e^{j\alpha}\mathbf{d}^{m,n} & -e^{j\alpha}\mathbf{d}^{m,n} & e^{j\beta}\mathbf{d}^{k,l} \end{bmatrix}, \frac{1}{\sqrt{12}}\begin{bmatrix} \mathbf{d}^{m,n} & \mathbf{d}^{k,l} & \mathbf{d}^{k,l} \\ e^{j\alpha}\mathbf{d}^{m,n} & e^{j\beta}\mathbf{d}^{k,l} & -e^{j\beta}\mathbf{d}^{k,l} \end{bmatrix}; \{m,n\},\{k,l\}=0,\ldots,N_p/2-1, m\neq n, k\neq l, \{\alpha,\beta\}=0,\pi/2$ |
| 4 | $\frac{1}{\sqrt{16}}\begin{bmatrix} \mathbf{d}^{m,n} & \mathbf{d}^{m,n} & \mathbf{d}^{k,l} & \mathbf{d}^{k,l} \\ e^{j\alpha}\mathbf{d}^{m,n} & -e^{j\alpha}\mathbf{d}^{m,n} & e^{j\beta}\mathbf{d}^{k,l} & -e^{j\beta}\mathbf{d}^{k,l} \end{bmatrix}; \{m,n\},\{k,l\}=0,\ldots,N_p/2-1, m\neq n, k\neq l, \{\alpha,\beta\}=0,\pi/2$ |

Figure 6

CODEBOOK (300) for FD-MIMO

| antenna ports | # MIMO layers | codebook table |
|---|---|---|
| 15 & 16 | 1 or 2 | Table 5.3.3A.2-1 (Figure 7A) |
| 15, 16, 17, 18 | 1 | Table 5.3.3A.2-2 (Figure 7B) |
| 15, 16, 17, 18 | 2 | Table 5.3.3A.2-3 (Figure 7C) |
| 15, 16, 17, 18 | 3 | Table 5.3.3A.2-4 (Figure 7D) |
| 15, 16, 17, 18 | 4 | Table 5.3.3A.2-5 (Figure 7E) |

Figure 7A

Table 5.3.3A.2-1: Codebook for transmission on antenna ports {15,16}

| Codebook index | Number of layers | |
|---|---|---|
| | $\upsilon = 1$ | $\upsilon = 2$ |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | - |
| 2 | $\frac{1}{\sqrt{2}}\begin{bmatrix}1\\j\end{bmatrix}$ | - |
| 3 | $\frac{1}{\sqrt{2}}\begin{bmatrix}1\\-j\end{bmatrix}$ | - |
| 4 | $\frac{1}{\sqrt{2}}\begin{bmatrix}1\\0\end{bmatrix}$ | - |
| 5 | $\frac{1}{\sqrt{2}}\begin{bmatrix}0\\1\end{bmatrix}$ | - |

Figure 7B

Table 5.3.3A.2-2: Codebook for transmission on antenna ports {15,16,17,18}

| Codebook index | Number of layers $v = 1$ | | | | | | | |
|---|---|---|---|---|---|---|---|---|
| 0 – 7 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |
| 8 – 15 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| 16 – 23 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

Figure 7C

Table 5.3.3A.2-3: Codebook for transmission on antenna ports {15,16,17,18}

| Codebook index | Number of layers $v = 2$ | | | |
|---|---|---|---|---|
| 0 – 3 | $\frac{1}{2}\begin{bmatrix}1 & 0\\1 & 0\\0 & 1\\0 & -j\end{bmatrix}$ | $\frac{1}{2}\begin{bmatrix}1 & 0\\0 & 1\\1 & 0\\0 & j\end{bmatrix}$ | $\frac{1}{2}\begin{bmatrix}1 & 0\\-j & 0\\0 & 1\\0 & -j\end{bmatrix}$ | $\frac{1}{2}\begin{bmatrix}1 & 0\\0 & 1\\-j & 0\\0 & -1\end{bmatrix}$ |
| 4 – 7 | $\frac{1}{2}\begin{bmatrix}1 & 0\\-1 & 0\\0 & 1\\0 & -j\end{bmatrix}$ | $\frac{1}{2}\begin{bmatrix}1 & 0\\0 & 1\\-1 & 0\\0 & j\end{bmatrix}$ | $\frac{1}{2}\begin{bmatrix}1 & 0\\-j & 0\\0 & 1\\0 & j\end{bmatrix}$ | $\frac{1}{2}\begin{bmatrix}1 & 0\\0 & 1\\-j & 0\\0 & 1\end{bmatrix}$ |
| 8 – 11 | $\frac{1}{2}\begin{bmatrix}1 & 0\\0 & 1\\0 & 1\\1 & 0\end{bmatrix}$ | $\frac{1}{2}\begin{bmatrix}1 & 0\\0 & 1\\-1 & 0\\0 & 1\end{bmatrix}$ | $\frac{1}{2}\begin{bmatrix}1 & 0\\0 & -1\\1 & 0\\0 & -1\end{bmatrix}$ | $\frac{1}{2}\begin{bmatrix}1 & 0\\0 & -1\\-1 & 0\\0 & 1\end{bmatrix}$ |
| 12 – 15 | $\frac{1}{2}\begin{bmatrix}1 & 0\\0 & 1\\0 & 1\\1 & 0\end{bmatrix}$ | $\frac{1}{2}\begin{bmatrix}1 & 0\\0 & 1\\-1 & 0\\0 & -1\end{bmatrix}$ | $\frac{1}{2}\begin{bmatrix}1 & 0\\0 & 1\\1 & 0\\0 & -1\end{bmatrix}$ | $\frac{1}{2}\begin{bmatrix}1 & 0\\0 & -1\\-1 & 0\\0 & -1\end{bmatrix}$ |

Figure 7D

Table 5.3.3A.2-4: Codebook for transmission on antenna ports {15,16,17,18}

| Codebook index | Number of layers $v = 3$ | | | |
|---|---|---|---|---|
| 0 – 3 | $\frac{1}{2}\begin{bmatrix}1&0&0\\1&0&0\\0&1&0\\0&0&1\end{bmatrix}$ | $\frac{1}{2}\begin{bmatrix}1&0&0\\-1&0&0\\0&1&0\\0&0&1\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ |
| 4 – 7 | $\frac{1}{2}\begin{bmatrix}1&0&0\\0&1&0\\0&0&1\\1&0&0\end{bmatrix}$ | $\frac{1}{2}\begin{bmatrix}1&0&0\\0&0&1\\0&1&0\\1&0&0\end{bmatrix}$ | $\frac{1}{2}\begin{bmatrix}1&0&0\\0&0&1\\0&1&0\\-1&0&0\end{bmatrix}$ | $\frac{1}{2}\begin{bmatrix}1&0&0\\0&1&0\\0&0&1\\0&-1&0\end{bmatrix}$ |
| 8 – 11 | $\frac{1}{2}\begin{bmatrix}0&0&1\\1&0&0\\0&1&0\\1&0&0\end{bmatrix}$ | $\frac{1}{2}\begin{bmatrix}0&1&0\\1&0&0\\0&0&1\\0&-1&0\end{bmatrix}$ | $\frac{1}{2}\begin{bmatrix}0&1&0\\1&0&0\\0&0&1\\0&0&-1\end{bmatrix}$ | $\frac{1}{2}\begin{bmatrix}0&1&0\\0&0&1\\1&0&0\\0&0&-1\end{bmatrix}$ |

Figure 7E

Table 5.3.3A.2-5: Codebook for transmission on antenna ports {15,16,17,18}

| Codebook index | Number of layers $\upsilon = 4$ |
|---|---|
| 0 | $\dfrac{1}{2}\begin{bmatrix}1 & 0 & 0 & 0\\ 0 & 1 & 0 & 0\\ 0 & 0 & 1 & 0\\ 0 & 0 & 0 & 1\end{bmatrix}$ |

CODEBOOK DESIGN FOR BEAMFORMED CSI-RS FOR FD-MIMO

CROSS-REFERENCE TO RELATED APPLICATIONS

Pursuant to 35 U.S.C. § 371, this application is the United States National Stage Application of International Patent Application No. PCT/IB2015/002620, filed on Dec. 24, 2015, claims priority to U.S. Provisional Patent Application No. 62/203,595, filed on Aug. 11, 2015, which is incorporated herein by reference in its entirely.

TECHNICAL FIELD

This application relates to channel state information reference signals and their use in full-dimensional multiple-input-multiple-output cellular networks.

BACKGROUND

The Evolved Packet Core (EPC) is the core network of advanced mobile communication systems. The EPC allows different radio access technologies (RATs) to operate in an integrated manner. These radio access technologies include first generation wireless Local Area Networks (LANs), second generation (2G) systems, such as Global System for Mobile communication, or GSM, third generation systems, such as the Universal Mobile Telecommunication System (UMTS), and fourth generation systems, such as Long Term Evolution (LTE).

Under LTE, a User Equipment (UE) connects to the EPC over the LTE access network known as E-UTRAN (short for Evolved UMTS Terrestrial Radio Access Network) and communicates with a base station known as the Evolved NodeB (eNB). The EPC is a packet-switched network in which the Internet Protocol is used for all transport services. The EPC is part of the $3^{rd}$ Generation Partnership Project (3GPP) specification.

Multiple-input-multiple-output (MIMO) under LTE exploits multiple antennas at both the UE and the eNB to improve the robustness of data transmissions (transmit diversity) and/or the data rate (spatial multiplexing). Along with MIMO, beamforming is a technique used in LTE to improve signal transmission between the eNB and the UE. Instead of broadcasting a signal to a wide area, the eNB aims the signal toward the UE. One way to achieve this is by separating the signal to be transmitted into an array of separate antenna signals and then weighting the magnitude and phase of each signal. An improvement of the received signal under this technique is known as a beamforming gain.

Starting with Release 8 of the 3GPP specification, MIMO has been supported and is found in many LTE cellular systems. However, as recently as Releases 10 and 12, the MIMO enhancements were designed to support antenna configurations at the eNB that are capable of adaptation in the azimuth only.

Thus, there is desired a system design to overcome the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 4 is a first codebook used by the codebook design method and apparatus of FIG. 1 for FD-MIMO cellular systems, according to some embodiments;

FIG. 5 is a second codebook used by the codebook design method and apparatus of FIG. 1 for FD-MIMO cellular systems, according to some embodiments;

FIG. 6 is a third codebook used by the codebook design method and apparatus of FIG. 1 for FD-MIMO cellular systems, according to some embodiments;

FIGS. 7A-7E are codebooks from the 3GPP specification, TS 36.211 v. 11.4.0, section 5.3.3A.2 that are used to generate the third codebook of FIG. 6, according to some embodiments;

DETAILED DESCRIPTION

Figure 1:
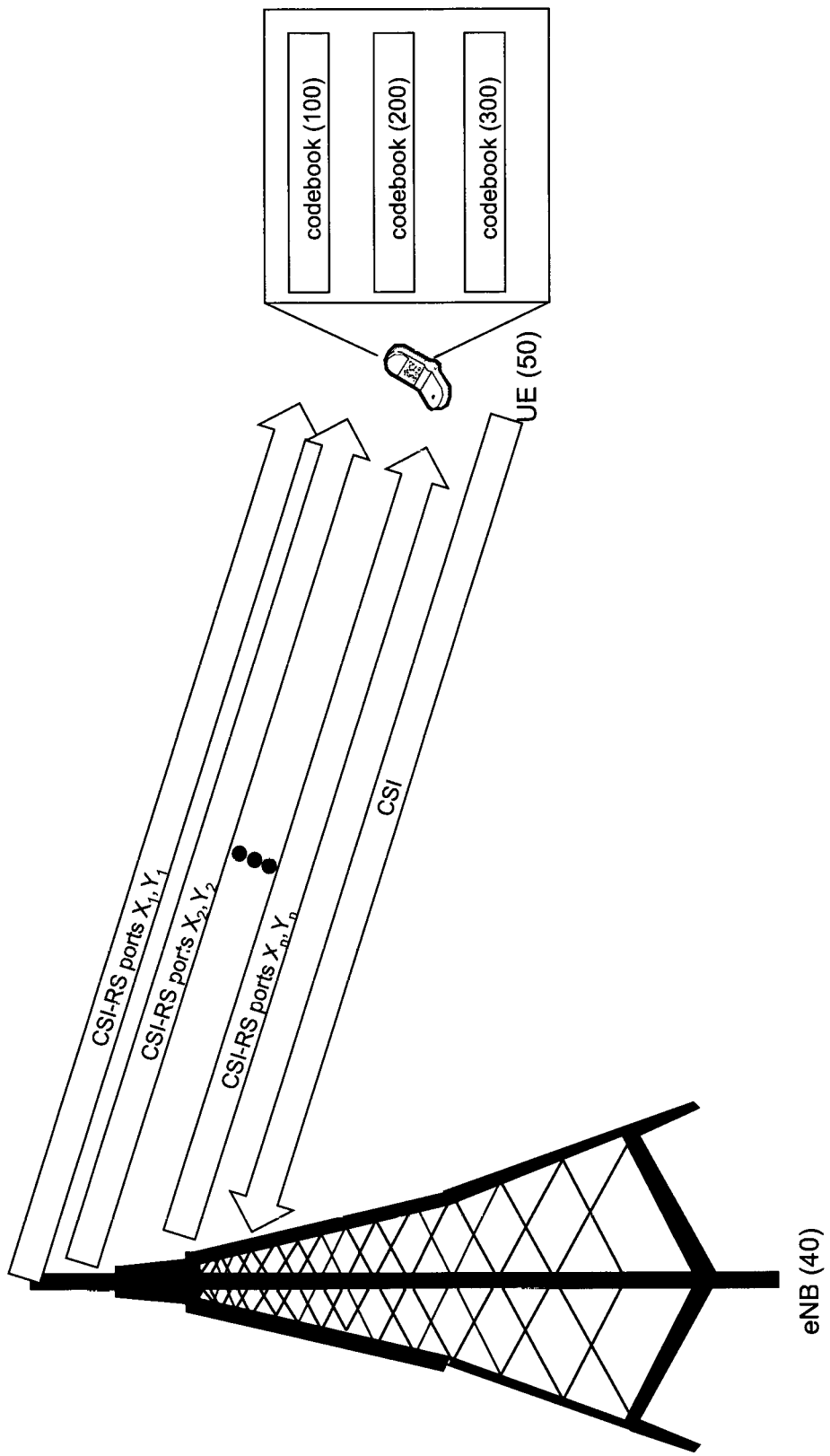
FIG. 1 is a simplified diagram used to illustrate the codebook design method and apparatus for FD-MIMO, according to some embodiments.

In accordance with the embodiments described herein, codebook designs are disclosed for full-dimensional multiple-input-multiple output (FD-MIMO) wireless cellular systems. The FD-MIMO cookbooks employ channel state information reference signals (CSI-RS). The codebook designs are used in beamforming CSI-RSs by the enhanced Node-B (eNB) (so called Class B), where the CSI-RS antenna ports are sent to the user equipment (UE) with the precoding (or beamforming) applied on the multiple antennas of the eNB, enabling the UE to perform estimation of the channel for CSI feedback after precoding (or beamforming). The codebooks for CSI support beam selection, co-phasing between polarizations, and beam combining.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. In other instances, well-known structures, materials, or operations are not shown or described in detail to avoid obscuring aspects of the disclosure. The following detailed description is, therefore, not to be construed in a limiting sense, as the scope of the subject matter is defined by the claims.

One LTE Advanced (LTE-A) topic involves configurations having multiple antennas, at the eNB and/or the UE. To support the increased complexity of multi-antenna configurations, changes in both the types of reference signals and feedback by the UE (channel estimation) are introduced in LTE-A.

Channel estimation is performed by the UE by measuring the transmission channel between the UE and the eNB. To do channel estimation, the UE receives a reference signal, known to both the UE and the eNB, from the eNB. There are several different types of reference signals defined under LTE. Cell-specific reference signals (CRS), for example, are located at each antenna port, and can be used by each UE in a cell serviced by the eNB. Antenna ports are logical entities and do not necessarily correspond to a physical antenna. Introduced in LTE Release 10, a channel state information reference signal (CSI-RS) is specifically designed to enable the UE to do channel estimation in multi-antenna configurations. CSI-RSs are transmitted less frequently than CRSs and each antenna port is associated with a different CSI-RS.

In performing channel estimation, the UE sends information, known as channel state information (CSI), to the eNB. CSI consists of channel quality information (CQI), rank information (RI) and precoding matrix indication (PMI). CQI, for example, provides information about the signal to noise plus interference ratio (SINR) of the transmission channel. Based on the CSI recommended by the UE, the eNB then applies an appropriate modulation and coding scheme (MCS) to subsequent UE transmissions. A low SINR for one transmission channel may result in a low MCS being used relative to another transmission channel having a higher (better) SINR. The eNB and the UE thereafter communicate using the MCS elected by the eNB, at least until the channel conditions between them change.

The other components of the CSI, namely PMI and RI, are mainly related to the support of MIMO transmissions. As described above, multiple-input-multiple-output (MIMO) refers to multiple antennas on either or both of the receiver or transmitter in a wireless cellular system. MIMO support commenced with Release 8 of the 3GPP specification and is found in many LTE cellular systems.

Continuing with Releases 10 and 11 of the 3GPP specification, the MIMO enhancements continue to support antenna configurations that adapt the beamforming in the azimuth direction only, with no reference to the adaptive beamforming in the elevation direction. The term "azimuth" describes the direction in the horizontal plane (e.g., parallel to the ground) while the term "elevation" describes the direction in the vertical plane (e.g., orthogonal to the ground).

Previously under LTE, mainly linear antenna arrays were considered, which generally allowed beamforming in one dimension. Under LTE-A, antennas on two-dimensional antenna arrays are considered and, for this, the beamforming can be controlled in two dimensions. Such a configuration may be beneficial in, for example, suburban scenarios, where antennas are mounted below rooftops and atop very tall buildings.

Although the antennas remain in fixed positions, a technique known as adaptive beamforming may be used to control the beams transmitted from the antennas of the eNB. In adaptive beamforming, the signal or set of signals corresponding to multiple MIMO layers for transmission from the antenna array is pre-coded, or multiplied, by specific antenna weights. The precoding or beamforming weights may be arranged into a matrix where each row corresponds to the antenna ports and each column to the MIMO layer. Depending on the selection of the weight, it is possible to skew or to change the beamforming from the antenna to the UE without changing the physical antenna position.

The CSI or, more specifically, the PMI and RI received from the UE, enables the eNB to transmit the signal with an appropriate beam or beams in case of multiple MIMO layers. The PMI and RI feedback from the UE to the eNB are based on a codebook that facilitates adaptation of the beamforming for subsequent Physical Downlink Shared CHannel (PDSCH) and Physical Uplink Shared CHannel (PUSCH) transmissions, where PDSCH is used for downlink data transport and PUSCH is used for uplink data transport. Populated with predetermined precoding vectors, the codebook is known to both the UE and the eNB.

The UE, based on the channel measurements taken on the CSI-RS, selects appropriate precoding vectors that could maximize the data rate, the SINR, or other desired characteristics of the transmission channel. Although the eNB makes the final decision about how a signal is to be precoded before transmission to the UE, the eNB receives a PMI recommendation from the UE based on the UE channel measurements.

In MIMO, it is possible to transmit multiple beams (also known as spatial MIMO layers or MIMO layers) over the same time and frequency resources to maximize spectral efficiency. The rank indicator (RI) indicates the number of MIMO layers that can be simultaneously transmitted to the UE. So, for example, if the UE is located within the line-of-sight to the base station, the base station can simultaneously transmit two signals over the same time and frequency resources by using, for example, two orthogonal polarizations. Because of their orthogonality, the two signals do not create interference with one another even though the same time and frequency resources are used.

Recently, there is an interest in enhancing system performance through the use of antenna systems having a two-dimensional array structure that provides adaptive control of the beams over both the elevation dimension and the azimuth dimension. Known as full-dimensional (FD) MIMO, the additional control over the elevation dimension enables a variety of strategies.

These strategies exploit the elevation dimension of the antenna for improved performance between the UE and the eNB. Sector-specific elevation beamforming, for example, involves the adaptive control over the vertical pattern beamwidth and/or downtilt. Vertical sectorization, also known as advanced sectorization in the vertical domain, can improve average system performance through the higher gain of the vertical sector patterns, but vertical sectorization generally does not involve additional standardization support. User-specific (UE-specific) elevation beamforming promises to increase the signal to interference-plus-noise ratio (SINR) statistics seen by the UEs by pointing the vertical antenna pattern in the direction of the UE. In some embodiments, the UE-specific elevation beamforming causes less interference to adjacent sectors by steering the transmitted energy in elevation.

FIG. 1 is a simplified diagram used to illustrate a codebook design method and apparatus 500 for FD-MIMO, according to some embodiments. The apparatus involved are a UE 50 and an eNB 40, downlink signals being transmitted from the eNB to the UE, an uplink signal being transmitted from the UE to the eNB, a selection of three different possible codebooks 100, 200, and 300, the CSI ports of CSI-RS (with 2*n of them in FIG. 1 denoted CSI-RS ports $X_1, Y_1, X_2, Y_2, \ldots, X_n, Y_n$) being transmitted in the downlink with different beamforming and polarization, and CSI being transmitted in the uplink. Based on the CSI-RS received from the eNB 40, the UE 50 takes one or more of the available codebooks to perform calculations that result in a CSI being transmitted to the eNB. The details of the codebook design method and apparatus 500 are provided below.

Figure 2:
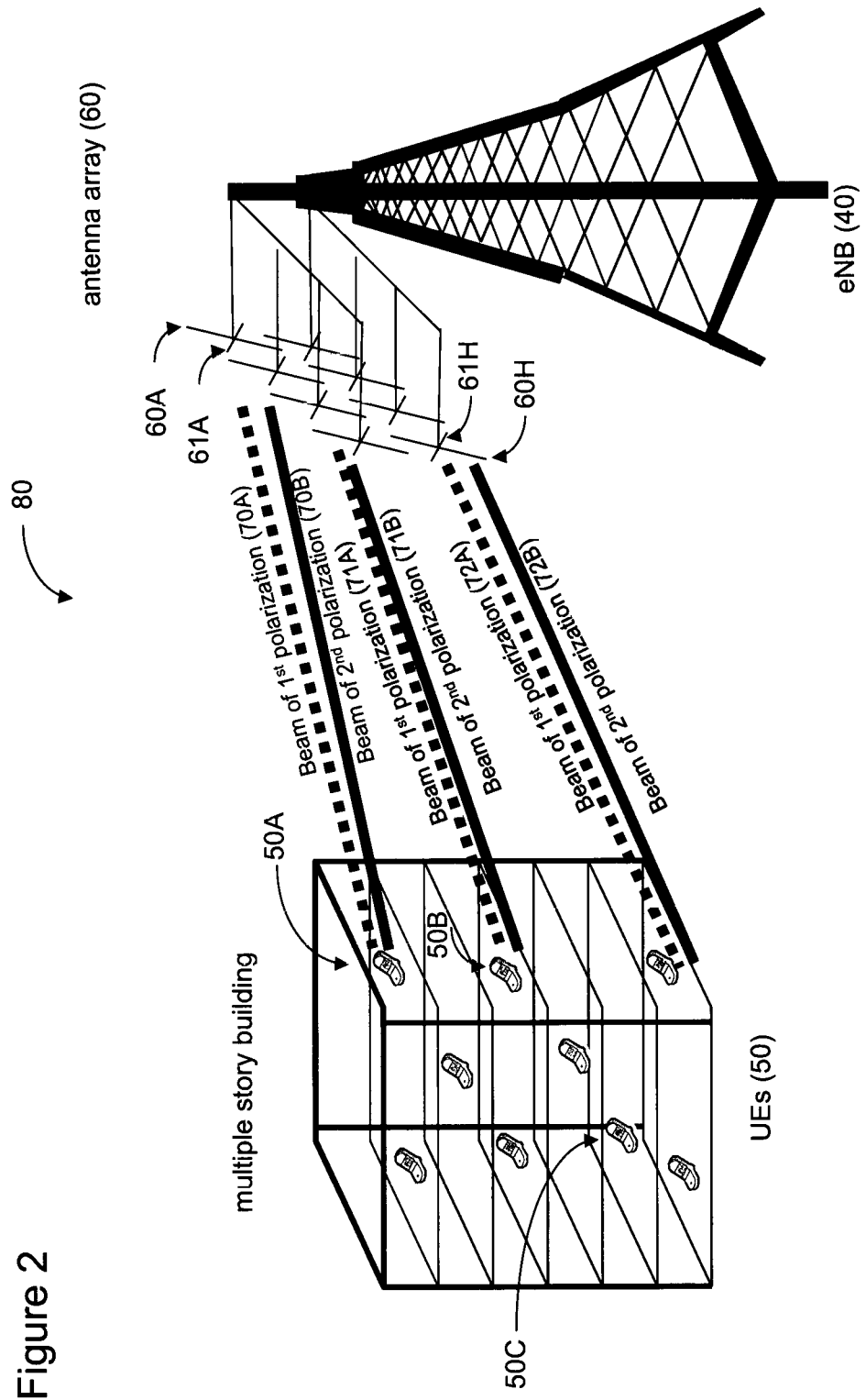
FIG. 2 is a simplified illustration of a wireless cellular neighborhood used to illustrate FD-MIMO, according to some embodiments.

FIG. 2 is a simplified illustration of a wireless cellular neighborhood 80, used to illustrate two-dimensional beamforming, according to some embodiments. The wireless cellular neighborhood consists of an eNB 40 and several UEs 50, with the UEs occupying a multiple-story building. The eNB 40 includes an antenna array 60 with 16 antennas, wherein 60A-60H are a first set of antennas with one polarization and 61A-61H are a second set of antennas of another polarization. The nearby multiple-story building includes multiple UEs 50 being served by the eNB. The antenna array comprising antennas 60A-60H and 61A-61H are transmitting beams 70A, 70B, and 70C of one polarization (dotted lines) and the same beams 71A, 71B, and 71C of another polarization (solid lines), to UEs 50A, 50B, and 50C, respectively.

Each beam 70A, 70B, 70C and 71A, 71B, 71C in FIG. 2 is being transmitted to a specific UE 50 in the wireless cellular neighborhood 80. By employing beamforming, the eNB is able to transmit the beams directionally. A signal to be transmitted by an eNB having multiple antennas may be multiplied by different complex weights, using a precoding vector, such that the signals transmitted by each antenna can target a specific location. The location may be a portion of the cellular region or a specific UE, with a goal being improved signal transmission.

In FIG. 2, CSI-RS ports are not transmitted from the physical antennas of the eNB 40. Instead, the multiple antennas 60A-60H and 61A-61H making up the antenna array 60 of the eNB are used to create one or more beams. Each CSI-RS antenna port (which is not a physical antenna) is transmitted in accordance to the beams of the eNB. In some embodiments, for each beam, two CSI-RS antenna ports are used, where each CSI-RS port corresponds to the same beam, but different polarizations.

Figure 3:
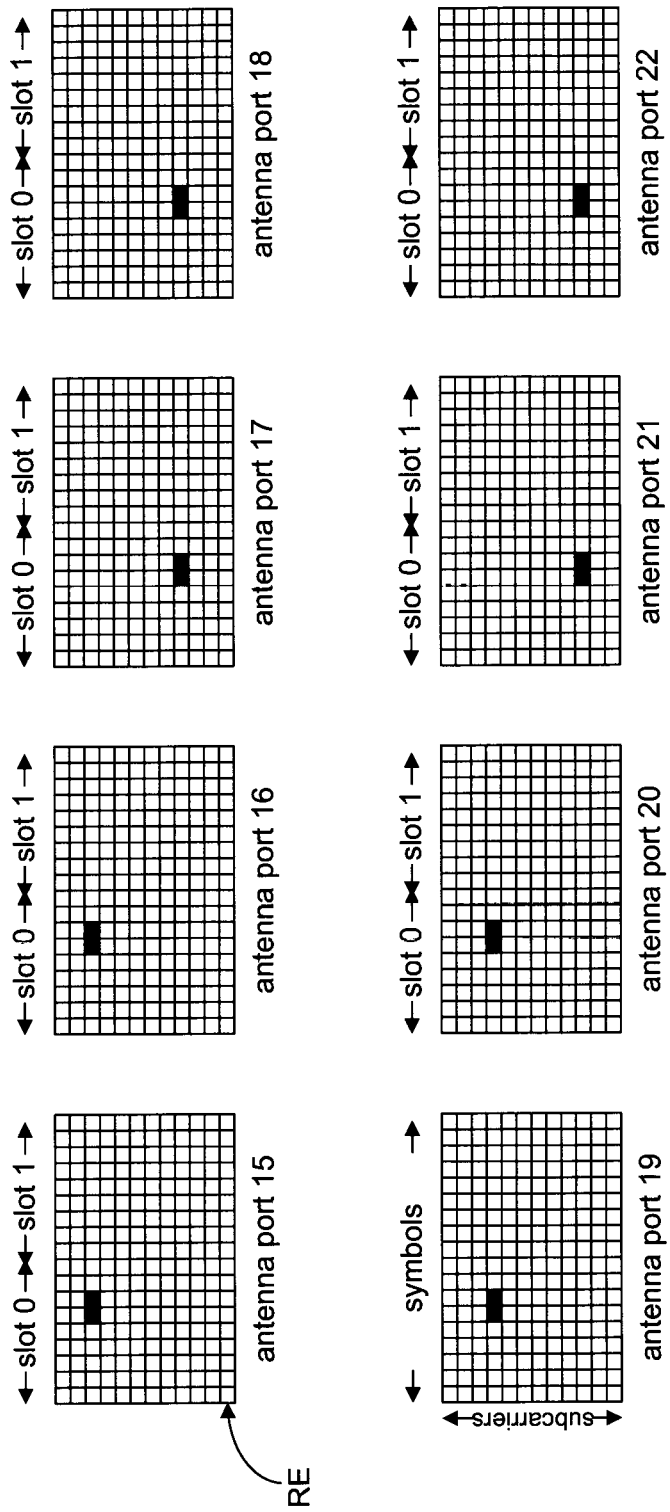
FIG. 3 is a mapping of CSI reference signals for CSI configuration 0, normal cyclic prefix, which may be used by the codebook design method and apparatus of FIG. 1, according to some embodiments.

FIG. 3 is a mapping of CSI reference signals for CSI configuration 0, normal cyclic prefix (3GPP TS 36.211 version 10.0.0 Release 10, Section 6.10.5.) The CSI reference signals may be used by the codebook design method and apparatus 500 of FIG. 1. Each CSI-RS antenna port is transmitted on a pair of resource element (REs) within a physical resource block (PRB) pair, wherein a PRB in the case of a subframe with a normal cyclic prefix consists of twelve subcarriers in the vertical (frequency) direction and seven symbols in the horizontal (time) direction. The pair of CSI-RS ports transmitted on the same REs may correspond to the same beam or different beams. In this example, the pair of RE are used to transmit two CSI-RS ports with the same beamforming and orthogonal polarizations, however the beam and polarization assignment to antenna ports are not limited to this example.

The UE may be performing channel measurements on the CSI-RS antenna ports. Using the codebook, the UE selects and evaluates different combinations of the selected CSI-RS antenna ports. The PDSCH and PUSCH, being the main downlink and uplink data-bearing channels, respectively, are subsequently transmitted on the favored combination.

During an FD-MIMO study item of the 3GPP specification, the support of FD-MIMO by using beamformed CSI-RS resource scheme has been found as a promising approach. The scheme applies different beamforming to the CSI-RS antenna ports to achieve better coverage of the CSI-RS transmissions without increasing the maximum number of CSI-RS antenna ports, as compared to the Release 12 LTE-A specification. Depending on the beamforming design, however, the existing codebook structure available in Release 12 may not be applicable for the precoding over beamformed CSI-RS antenna ports.

A codebook under LTE Release 8 supports up to four MIMO layers (rank 4). The codebook is characterized as having a constant modulus design, a nested property, and employs minimal complex multiplications. The constant modulus property ensures that the power amplifier connected to each antenna is loaded equally. The nested property is how the codebooks of different ranks are arranged such that a lower rank codebook is a subset of the higher rank codebook vectors, and ensures that the CQI calculations are simplified across the different ranks. The minimal complex multiplications design rule is illustrated, for example, in codebook multiplications for two-antenna codebooks use +1, −1, +j, and −j, where j is an imaginary number.

Under LTE Release 10, a dual codebook for eight transmit antennas is introduced. The dual codebook is a double four-bit codebook obtained by multiplying two precoding matrices, denoted $W_1$ and $W_2$, where $W_1$ represents long-term and wideband channel characteristics, and $W_2$ represents short-term and subband channel characteristics. The LTE Release 10 dual codebook, also maintains the constant modulus property for all codewords or PMI in the codebook.

The constant modulus property of the previous LTE codebooks may not be appropriate when CSI-RS antenna ports are differently beamformed, given that only part of the beams usually provides noticeable performance improvement at the UE. Therefore, the codebook design with non-constant modulus property for the precoder is proposed as an enhancement to the beamformed CSI-RS resources.

FIG. 4 (and equations (1)-(4) below) illustrate a first codebook 100 used by the codebook design method and apparatus 500 to support FD-MIMO cellular systems, according to some embodiments. In contrast to prior art LTE codebooks, the codebook 100 does not exhibit a constant modulus property of the PMI elements. The codebook 100 does however support beam selection and co-phasing, as described in more detail below. The codebook 100 supports FD-MIMO systems with beamformed CSI-RS resources.

In some embodiments, for the beamformed CSI-RS approach where each CSI-RS antenna port is differently beamformed, the codebook 100 follows the structure of $W_2$ defined for Release 10 and Release 12 codebooks. More specifically, the codebook 100 supports beam-selection and co-phasing between polarizations. A second codebook 200, described below, further supports the combining of different beams.

In some embodiments, the codebook 100 facilitates beam selection by introducing a vector, $e^m$, of length $N_p/2$, where $N_p$ is the total number of CSI-RS antenna ports. For the eNB antenna system with cross-polarized antenna elements, the $N_p/2$ may correspond to the number of beams configured for beam selection and co-phasing by the proposed codebook. The $e^m$ vector is also known as a selection vector, with a value of "1" in the $m^{th}$ position of the vector and a value of "0" in the other positions. The codebook 100 also features a complex scaling factor, $e^{j\alpha}$, for each beam selection vector. The complex scaling factor, $e^{j\alpha}$, provides the co-phasing of the beams corresponding to the different polarizations. Co-phasing element, a, enables precoding across beams corresponding to different polarizations. In some embodiments, a, is either 0 or $\pi/2$.

Using the codebook 100, the transmission of multiple MIMO layers is provided by using different polarizations over the same beam or different beams. Then, assuming that the half of CSI-RS antenna ports $N_p/2$ corresponds to the beamformed antenna ports of the same polarization, the codebook for rank 1-4 is defined as follows:

Rank 1(one MIMO layer):

$$\frac{1}{\sqrt{2}}\begin{bmatrix} e^m \\ e^{j\alpha}e^m \end{bmatrix},\quad (1a)$$

$$\frac{1}{\sqrt{2}}\begin{bmatrix} e^m \\ -e^{j\alpha}e^m \end{bmatrix},\quad (1b)$$

$\{m\} = 0, \ldots, N_p/2 - 1, \{\alpha\} = 0, \pi/2$ where $e^m$ is a selection vector of length $N_p/2$, where $N_p$ is the total number of CSI-RS antenna ports. The $e^m$ selection vector has a value of "1" in the $m^{th}$ position of the vector and a value of "0" in the other positions. $e^{j\alpha}$ is the complex scaling factor and $\alpha$ is the polarization (or co-phasing) element.

In equation (1a), it can be seen that the precoder for a single MIMO layer is obtained by concatenation of two selection vectors $e^m$. The first selection vector, representing a selected beam m for the antenna ports of one polarization and the second selection vector representing a selected beam m for the antennas of another polarization. In equation (1) the selection vector $e^m$ is common for both the top and bottom elements of the rank 1 PMI, which corresponds to the selection of the same beam m for the antennas of both polarizations. In equation (1) the bottom selection vector $e^m$ is multiplied by the exponential term, $e^{j\alpha}$, that performs additional precoding of the signal transmitted by the selected beam on the antennas of the second polarization.

The second set of the precoding vectors in equation (1b) also uses the same selected beam m for both polarizations, and is only distinguished from the first set of the precoding vectors by a minus iii the bottom vector to provide additional precoding of the signal transmitted by the selected beam on the antenna ports of the second polarization.

The $e^m$ vector is useful because it indicates the appropriate beam for the antenna ports of each polarizations and the precoding across the beams of two polarizations for the data transmission. If there are eight antenna ports, the $e^m$ vector will be a 4×1 selection vector, which corresponds to the four beams in case of antennas with two polarizations. If there are four beams, then, depending on the precoding vector, when the UE is doing PMI feedback, by changing m, the UE will indicate one beam as preferred among the four possible measured beams including the most appropriate precoding $e^{j\alpha}$ of the signals across two beams corresponding to two polarizations.

Rank 2(two MIMO layers):

$$\frac{1}{\sqrt{4}}\begin{bmatrix} e^m & e^m \\ e^{j\alpha}e^m & -e^{j\alpha}e^m \end{bmatrix},\quad (2)$$

$\{m\} = 0, \ldots, N_p/2 - 1, \{\alpha\} = 0, \pi/2$

To support the nested property of the codebook 100, the rank 2 codebook entry has similar structure to the rank 1 entry. For the rank 2 codebook, each PMI indicates the selected beam for two MIMO layers. In equation (2) the precoding vector for two MIMO layers selects the same beam m, but applies different precoding across the selected beam of different polarizations. The precoding for beams of different polarizations are selected to provide orthogonal polarizations for two MIMO layers after precoding.

Rank 3(three MIMO layers):

$$\frac{1}{\sqrt{6}}\begin{bmatrix} e^m & e^m & e^k \\ e^{j\alpha}e^m & -e^{j\alpha}e^m & e^{j\beta}e^k \end{bmatrix},\quad (3a)$$

$$\frac{1}{\sqrt{6}}\begin{bmatrix} e^m & e^k & e^k \\ e^{j\alpha}e^m & e^{j\beta}e^k & -e^{j\beta}e^k \end{bmatrix},\quad (3b)$$

$\{m,k\} = 0, \ldots, N_p/2 - 1, m \neq k, \{\alpha,\beta\} = 0, \pi/2$ where $e^k$, like $e^m$, is a selection vector of length $N_p/2$, where $N_p$ is the total number of CSI-RS antenna ports. The $e^k$ vector has a value of "1" in the $k^{th}$ position of the vector and a value of "0" in the other positions, with k being different from m. Like the $e^{j\alpha}$ and $e^{j\beta}$ are also a complex scaling factors and $\beta$ is the polarization element with $\alpha$ being the same as or different from $\beta$.

Under rank 3, for the first set of the PMIs (equation (3a)), the first two MIMO layers are transmitted using the same beam m, given by selection vector $e^m$ but using orthogonal polarizations achieve by using orthogonal precoding across polarizations. The third column however uses a second beam indicated by k which is different than selected beam m and by using same or different co-phasing element, $\beta$.

For the second set of PMIs (equation (3b)), the first MIMO layer is transmitted using a first beam given by m, while the second and third MIMO layers are transmitted using the same second beam, given by k, the latter two using orthogonal polarizations. The first MIMO layer uses the co-phasing element, $\alpha$, and the second and third MIMO layers use the co-phasing element, $\beta$, where $\alpha$ and $\beta$ may be the same or different.

Rank 4(four MIMO layers):

$$\frac{1}{\sqrt{8}}\begin{bmatrix} e^m & e^m & e^k & e^k \\ e^{j\alpha}e^m & -e^{j\alpha}e^m & e^{j\beta}e^k & -e^{j\beta}e^k \end{bmatrix},\quad (4)$$

$\{m,k\} = 0, \ldots, N_p/2 - 1, m \neq k, \{\alpha,\beta\} = 0, \pi/2$

Under rank 4, two different MIMO layers, given by m and k, are used and two different polarizations determined by $\alpha$ and $\beta$ are used. In the first column, the precoder for the first MIMO layer uses the beam, given by m. In the second column, the same beam m for the second MIMO layer is used, but with orthogonal polarization comparing to polarization of the first beam. In the third and fourth column, which determine precoding for the third and fourth MIMO layer, the same beam k is used, which is different from the selected beam m for the first MIMO layers. The polarizations for two MIMO layers determined by $\beta$ are orthogonal for the third and fourth MIMO layers.

The codebook entries can be obtained by changing over all possible combinations of the parameters n, k, $\alpha$, and $\beta$ given by equations (1)-(4). Thus, the UE uses the codebook 100 to scan all possible combinations of the selected beams and co-phasing of polarization to find the one (or more) with the best transmission characteristics. In some embodiments, if the size of the codebook 100 for all possible combinations is large, the codebook size can be reduced by defining the codebook, which uses subsets of all possible n, k, $\alpha$, and $\beta$.

In some embodiments, the codebook 100 supports beam selection and co-phasing, as described above. Codebook designers of ordinary skill in the art recognize that the entries (1)-(4) of the codebook 100 (and as illustrated in FIG. 4) may be adjusted without departing from these principles.

FIG. 5 and equations (5)-(8) below illustrate a second codebook 200 used by the codebook design method and apparatus 500, according to some embodiments. In the codebook 200, a $d^{m,n}$ vector of length $N_p/2$ is not an single beam selection vector, but instead includes a value of "1" in both the $m^{th}$ and $n^{th}$ positions (m≠n) of the vector, and a value of "0" in the other positions. Thus, in addition to supporting single beam selection and co-phasing, the codebook 200 also supports two beam selection and combining. The codebook 200 is shown as follows:

Rank 1(one MIMO layer):

$$\frac{1}{\sqrt{4}} \begin{bmatrix} d^{m,n} \\ e^{j\alpha} d^{m,n} \end{bmatrix}, \quad (5a)$$

$$\frac{1}{\sqrt{4}} \begin{bmatrix} d^{m,n} \\ -e^{j\alpha} d^{m,n} \end{bmatrix}, \quad (5b)$$

$\{m, n\} = 0, \ldots, N_p/2 - 1, m \neq n, \{\alpha\} = 0, \pi/2$ where $d^{m,n}$ is a vector of length $N_p/2$, where $N_p$ is the total number of CSI-RS antenna ports. The $d^{m,n}$ vector has a value of "1" in the $m^{th}$ and $n^{th}$ positions of the vector and a value of "0" in the other positions. The $e^{j\alpha}$ is the complex scaling factor and a is the co-phasing element.

Rank 2(two MIMO layers):

$$\frac{1}{\sqrt{8}} \begin{bmatrix} d^{m,n} & d^{m,n} \\ e^{j\alpha} d^{m,n} & -e^{j\alpha} d^{m,n} \end{bmatrix}, \quad (6)$$

$\{m\} = 0, \ldots, N_p/2 - 1, \{\alpha\} = 0, \pi/2$

To support nested property of the codebook 200, the rank 2 codebook structure is similar to the rank 1 codebook structure. The precoding for two MIMO layers assumes the same selected beams for m and n for both MIMO layers, but orthogonal polarizations determined by co-phasing element a.

As in the codebook 100, the rank 3 entry for the codebook 200 includes two different entries, given by equations (7a) and (7b), according to some embodiments.

Rank 3(three MIMO layers):

$$\frac{1}{\sqrt{12}} \begin{bmatrix} d^{m,n} & d^{m,n} & d^{k,l} \\ e^{j\alpha} d^{m,n} & -e^{j\alpha} d^{m,n} & e^{j\beta} d^{k,l} \end{bmatrix}, \quad (7a)$$

$$\frac{1}{\sqrt{12}} \begin{bmatrix} d^{m,n} & d^{k,l} & d^{k,l} \\ e^{j\alpha} d^{m,n} & e^{j\beta} d^{k,l} & -e^{j\beta} d^{k,l} \end{bmatrix}, \quad (7b)$$

$\{m, n\}, \{k, l\} = 0, \ldots, N_p/2 - 1, m \neq n, k \neq l, \{\alpha, \beta\} = 0, \pi/2$ where, like $d^{m,n}$, $d^{k,l}$ is a vector of length $N_p/2$, where $N_p$ is the total number of CSI-RS antenna ports. The $d^{k,l}$ vector has a value of "1" in the $k^{th}$ and $l^{th}$ positions of the vector and a value of "0" in the other positions, with m being unequal to k. The $e^{j\beta}$, is the complex scaling factor and β is the co-phasing element, with a being the same or different as β.

Rank 4(four MIMO layers):

$$\frac{1}{\sqrt{16}} \begin{bmatrix} d^{m,n} & d^{m,n} & d^{k,l} & d^{k,l} \\ e^{j\alpha} d^{m,n} & -e^{j\alpha} d^{m,n} & e^{j\beta} d^{k,l} & -e^{j\beta} d^{k,l} \end{bmatrix}, \quad (8)$$

$\{m, n\}, \{k, l\} = 0, \ldots, N_p/2 - 1, m \neq n, k \neq l, \{\alpha, \beta\} = 0, \pi/2$ In another implementation of the codebook 200, the vector, $d^{m,n}$, of length $N_p/2$ includes a value of "1" in the $m^{th}$ position and a value of "−1" in the $n^{th}$ positions (m≠n) and a value of "0" in the other positions.

In still another implementation of the codebook 200, the vector, $d^i$, of length $N_p/2$ includes non-integer values in the $m^{th}$ and $n^{th}$ elements as follows:

$$d^i = \begin{cases} d_m, & i = m \\ d_n, & i = n \\ 0, & \text{otherwise} \end{cases} \quad (9)$$

where m≠n. This enables unequal power distribution between the two selected beams. For example, $d_m = \sqrt{0.8}$, $d_n = \sqrt{1.2}$ such that, $d_m^2 + d_n^2 = 2$.

Thus, in some embodiments, like the codebook 100, the codebook 200 supports beam selection and co-phasing, as described above. Further, the codebook 200 supports beam combining. Codebook designers of ordinary skill in the art recognize that the entries (5)-(9) of the codebook 200 (some of which is illustrated in FIG. 5) may be adjusted without departing from these principles.

As illustrated in FIG. 1, a third codebook 300 may be used by the codebook design method and apparatus 500 to support FD-MIMO cellular systems, according to some embodiments. The codebook 300 follows the uplink codebook defined in TS 36.211 v. 11.4.0, section 5.3.3A.2 to support uplink transmissions. Thus, as illustrated in FIG. 6, the codebook 300 is made up of five different sets of codebooks from section 5.3.3A.2. FIGS. 7A-7E illustrate the codebooks from which the codebook 300 is generated.

Figure 8:
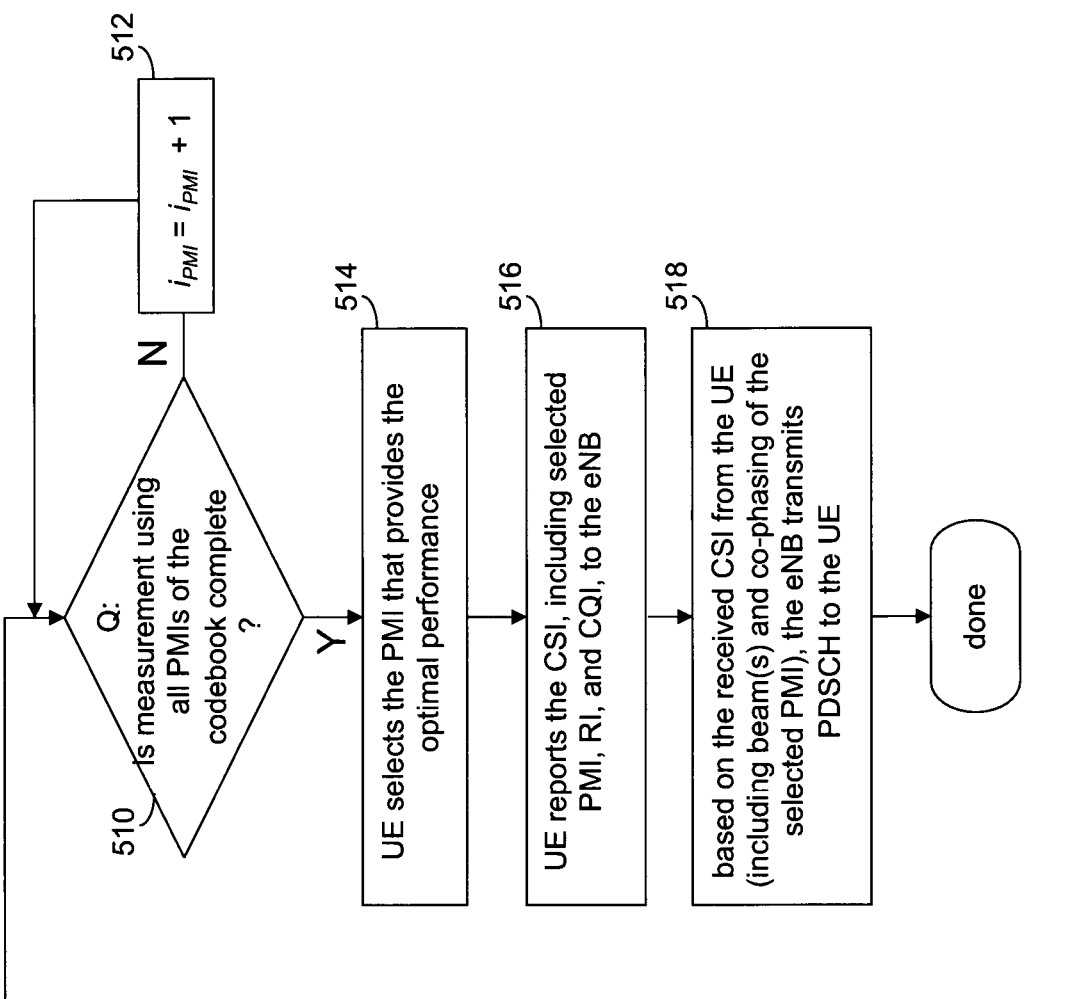
FIG. 8 is a flow diagram illustrating operation of the codebook design method and apparatus of FIG. 1, according to some embodiments.

FIG. 8 is a flow diagram illustrating the codebook design method 500 of FIG. 1, according to some embodiments. The operations of the codebook design method 500 may take place in an order different than is illustrated.

The eNB transmits the CSI-RS signals comprising one or more CSI-RS antenna ports, where each CSI-RS antenna port corresponds to one beamforming and one polarization (block 502). The eNB configures the UE with CSI-RS signal parameters (e.g., number of CSI-RS antenna ports) for channel measurements on CSI-RS antenna ports and the proposed codebook for CSI calculation (block 504), for example, codebooks 100, 200, or 300.

Having the CSI-RS signal parameters, the UE is able to perform measurements on the CSI-RS antenna ports of the configured CSI-RS. The UE scans over all possible PMIs of the configured codebook (block 506-512). Once all possible PMIs have been used, the UE chooses the PMI that provides the optimal performance (block 514). This enables the UE to report the CSI, including the selected PMI, the RI, and the CQI, to the eNB (block 516). The eNB is thereafter able to transmit PDSCH to the UE, based on the received CSI from the UE, including beam(s) and co-phasing according to the selected PMI (block 518).

Thus, UE is able to choose the best PMI from the codebook (100, 200, 300) every time it receives CSI-RS, which carries multiple CSI-RS antenna ports, where each CSI-RS port is differently beamformed or corresponds to a different polarization.

As used herein, the term "circuitry" may refer to, be part of, or include an ASIC, an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 9:
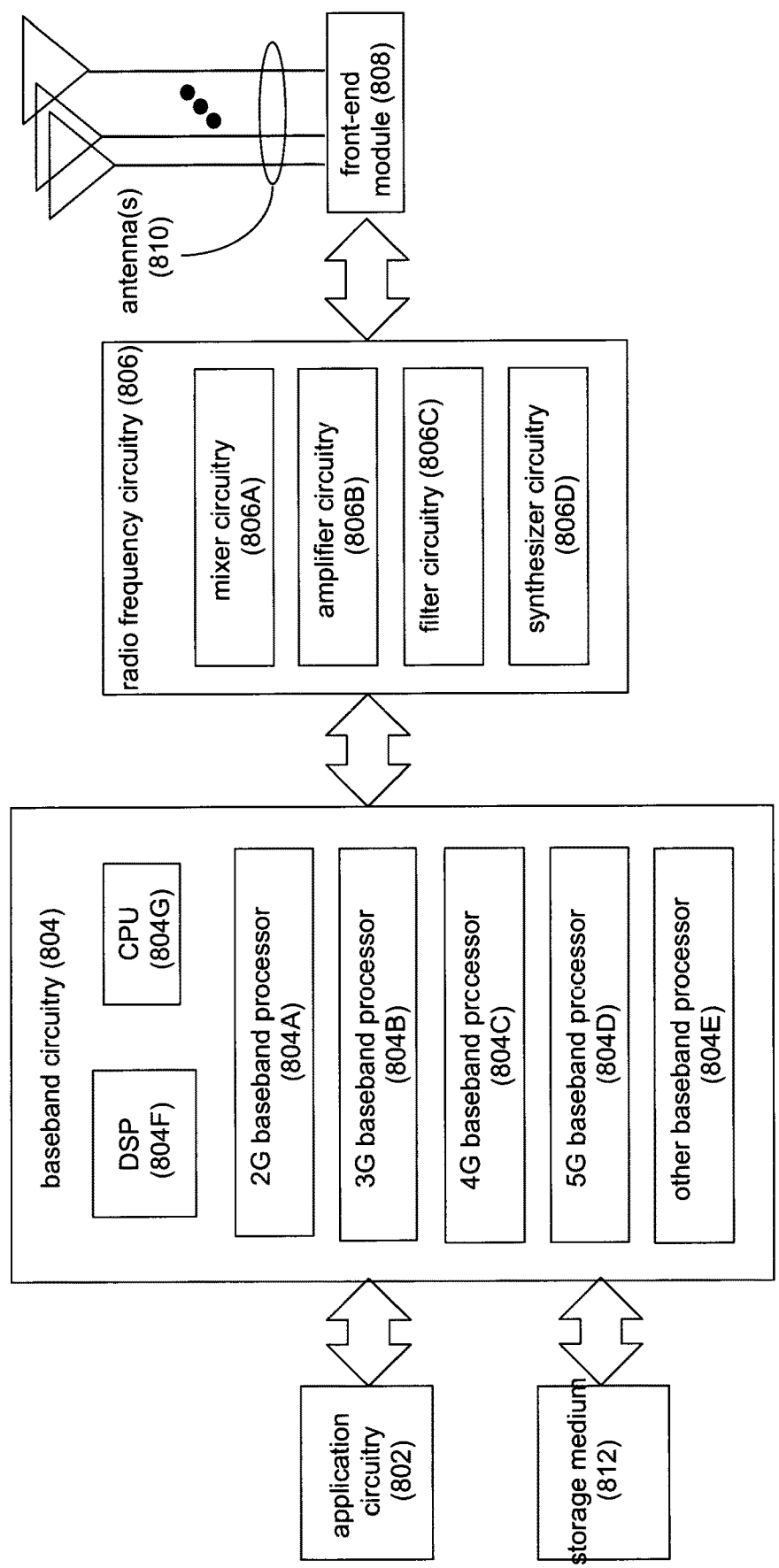
FIG. 9 is a simplified block diagram of a UE capable of implementing the codebook design method and apparatus of FIG. 1 using the codebooks of FIGS. 4, 5, and 6, according to some embodiments.

Embodiments described herein may be implemented into a system using any suitably configured hardware and/or software. FIG. 9 illustrates, for one embodiment, example components of a User Equipment (UE) device 800. In some embodiments, the UE device 800 may include application circuitry 802, baseband circuitry 804, Radio Frequency (RF) circuitry 806, front-end module (FEM) circuitry 808 and one or more antennas 810, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium 812 or other type of memory/storage and may be configured to execute instructions stored in the memory/storage to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804A, third generation (3G) baseband processor 804B, fourth generation (4G) baseband processor 804C, and/or other baseband processor(s) 804D for other existing generations, generations in development, or to be developed in the future (e.g., fifth generation (5G), 6G, etc.). The baseband circuitry 804 (e.g., one or more of baseband processors 804A-D) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an EUTRAN protocol including, for example, physical (PHY), media access control (MAC), radio link control (RLC), packet data convergence protocol (PDCP), and/or radio resource control (RRC) elements. A central processing unit (CPU) 804E of the baseband circuitry 804 may be configured to run elements of the protocol stack for signaling of the PHY, MAC, RLC, PDCP, and/or RRC layers. In some embodiments, the baseband circuitry may include one or more audio digital signal processor(s) (DSP) 804F. The audio DSP(s) 804F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an EUTRAN and/or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc., to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806A, amplifier circuitry 806B and filter circuitry 806C. The transmit signal path of the RF circuitry 806 may include filter circuitry 806C and mixer circuitry 806A. RF circuitry 806 may also include synthesizer circuitry 806D for synthesizing a frequency for use by the mixer circuitry 806A of the receive signal path and the transmit signal path. In some embodiments, the mixer circuitry 806A of the receive signal path may be configured to down-convert RF signals received from the FEM circuitry 808 based on the synthesized frequency provided by synthesizer circuitry 806D. The amplifier circuitry 806B may be configured to amplify the down-converted signals and the filter circuitry 806C may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806A of the receive signal path may comprise passive mixers, although the scope of the embodiments is not limited in this respect.

In some embodiments, the mixer circuitry 806A of the transmit signal path may be configured to up-convert input baseband signals based on the synthesized frequency provided by the synthesizer circuitry 806D to generate RF output signals for the FEM circuitry 808. The baseband signals may be provided by the baseband circuitry 804 and may be filtered by filter circuitry 806C. The filter circuitry 806C may include a low-pass filter (LPF), although the scope of the embodiments is not limited in this respect.

In some embodiments, the mixer circuitry 806A of the receive signal path and the mixer circuitry 806A of the transmit signal path may include two or more mixers and may be arranged for quadrature down-conversion and/or up-conversion, respectively. In some embodiments, the mixer circuitry 806A of the receive signal path and the mixer circuitry 806A of the transmit signal path may include two or more mixers and may be arranged for image rejection (e.g., Hartley image rejection). In some embodiments, the mixer circuitry 806A of the receive signal path and the mixer circuitry may be arranged for direct down-conversion and/or direct up-conversion, respectively. In some embodiments, the mixer circuitry 806A of the receive signal path and the mixer circuitry of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806D may be a fractional-N synthesizer or a fractional N/N+1 synthesizer, although the scope of the embodiments is not limited in this respect as other types of frequency synthesizers may be suitable. For example, synthesizer circuitry 806D may be a delta-sigma synthesizer, a frequency multiplier, or a synthesizer comprising a phase-locked loop with a frequency divider.

The synthesizer circuitry 806D may be configured to synthesize an output frequency for use by the mixer circuitry 806A of the RF circuitry 806 based on a frequency input and a divider control input. In some embodiments, the synthesizer circuitry 806D may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802, depending on the desired output frequency. In some embodiments, a divider control input (e.g., N) may be determined from a look-up table based on a channel indicated by the applications processor 802.

Synthesizer circuitry 806D of the RF circuitry 806 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump, and a D-type flip-flop. In these embodiments, the delay elements may be configured to break a VCO period up into $N_d$ equal packets of phase, where $N_d$ is the number of delay elements in the delay line. In this way, the DLL provides negative feedback to help ensure that the total delay through the delay line is one VCO cycle.

In some embodiments, synthesizer circuitry 806D may be configured to generate a carrier frequency as the output frequency, while in other embodiments, the output frequency may be a multiple of the carrier frequency (e.g., twice the carrier frequency, four times the carrier frequency), and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

In some embodiments, the UE device 800 may include additional elements such as, for example, memory/storage, display, camera, sensor, and/or input/output (I/O) interface.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. A non-transitory computer-readable storage medium can be a computer-readable storage medium that does not include a signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid-state drive, or other medium for storing electronic data. The node and wireless device may also include a transceiver module, a computer module, a processing module, and/or a clock module or timer module. One or more programs that may implement or utilize the various techniques described herein may use an application programming interface (API), reusable controls, and the like. Such programs may be implemented in a high-level procedure or object-oriented programming language to communicate with a computer system. However, the program(s) may be implemented in assembly or machine language, if desired. In any case, the language may be a compiled or interpreted language, and combined with hardware implementations.

It should be understood that many of the functional units described in the specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may be not physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or means that a particular feature, structure, or characteristic described in connection with the example is included in at least one embodiment. Thus, appearances of the phrases, "in an example" or "in some embodiments" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations. Furthermore, the described features, structures, or characteristics may be combined in any suitable manner in one or more embodiments.

In summary, the codebook design method and apparatus 500 can be implemented, in a first example, as part of a user equipment (UE) to perform channel estimation of a transmission channel of a wireless cellular network, where the UE measures a channel state information reference signal (CSI-RS) of a downlink signal received on the transmission channel, calculates channel state information (CSI) of the transmission channel using a codebook along with the CSI-RS, the codebook comprising a plurality of precoding matrices, the codebook further comprising non-constant modulus elements with at least two non-zero elements in each precoding vector; and reports the CSI of the transmission channel by way of an uplink transmission.

Further to the first example or any other example discussed herein, in a second example, the UE calculates the CSI of the transmission channel using a precoding matrix of the codebook, wherein each vector of the precoding matrix comprises a concatenation at least two selection vectors and each selection vector comprises a single non-zero element and remaining zero elements.

Further to the second example or any other example discussed herein, in a third example, the UE calculates the CSI of the transmission channel using the precoding matrix of the codebook, wherein the non-zero element in the selection vector has a first amplitude and a first phase and the second non-zero element has the first amplitude and a second phase, wherein the first phase differs from the second phase by 0, $\pi/2$, $2\pi/2$, or $3\pi/2$.

Further to the first example or any other example discussed herein, in a fourth example, the UE calculate the CSI of the transmission channel using a precoding matrix of the codebook, wherein each vector of the precoding matrix comprises a concatenation of at least two selection vectors and each selection vector comprises a first non-zero element, a second non-zero element, and the remaining zero elements.

Further to the fourth example or any other example discussed herein, in a fifth example, the first and second non-zero element in the first selection vector has a first amplitude and the first and second non-zero element in the second selection vector has a second amplitude and a second phase, wherein the first phase differs from the second phase by 0, $\pi/2$, $\pi$, or $3\pi/4$.

Further to the fourth example or any other example discussed herein, in a sixth example, the first non-zero element in the selection vector has a first amplitude and a first phase and the second non-zero element has the first amplitude and a second phase, wherein the first phase differs from the second phase by 0 or $\pi$.

Further to the first example or any other example discussed herein, in a seventh example, the UE calculates the CSI of the transmission channel using the codebook, wherein each of the plurality of matrices in the codebook comprises vectors in which each vector comprises four non-zero elements and remaining zero elements.

Further to the fourth example or any other example discussed herein, in an eighth example, the first non-zero element has a first amplitude and a first phase and the second non-zero element has the first amplitude and a second phase, wherein the first phase differs from the second phase by 0, $\pi/2$, $\pi$, or $3\pi/2$.

Further to the first example or any other example discussed herein, in a ninth example, the UE calculates the CSI of the transmission channel using the codebook, wherein the codebook for rank 1 CSI reporting contains at least one element from the following set of the vectors:

$$\frac{1}{\sqrt{2}}\begin{bmatrix} e^m \\ e^{j\alpha}e^m \end{bmatrix}, \frac{1}{\sqrt{2}}\begin{bmatrix} e^m \\ -e^{j\alpha}e^m \end{bmatrix}, \{m\} = 0, \ldots, N_p/2 - 1, \{\alpha\} = 0, \pi/2,$$

wherein $e^m$ is a selection vector of length $N_p/2$, $N_p$ is a total number of CSI-RS antenna ports.

Further to the first example or any other example discussed herein, in a tenth example, the UE calculates the CSI of the transmission channel using the codebook, wherein the codebook for rank 2 CSI reporting contains at least one element from the following set:

$$\frac{1}{\sqrt{4}}\begin{bmatrix} e^m & e^m \\ e^{j\alpha}e^m & -e^{j\alpha}e^m \end{bmatrix}, \{m\} = 0, \ldots, N_p/2 - 1, \{\alpha\} = 0, \pi/2,$$

wherein $e^m$ is a selection vector of length $N_p/2$, $N_p$ is a total number of CSI-RS antenna ports.

Further to the first example or any other example discussed herein, in an eleventh example, the UE calculates the CSI of the transmission channel using the codebook, wherein the codebook for rank 3 CSI reporting contains at least one element from the following set:

$$\frac{1}{\sqrt{6}}\begin{bmatrix} e^m & e^m & e^k \\ e^{j\alpha}e^m & -e^{j\alpha}e^m & e^{j\beta}e^k \end{bmatrix},$$

$$\frac{1}{\sqrt{6}}\begin{bmatrix} e^m & e^k & e^k \\ e^{j\alpha}e^m & e^{j\beta}e^k & -e^{j\beta}e^k \end{bmatrix},$$

$$\{m, k\} = 0, \ldots, N_p/2 - 1, m \neq k, \{\alpha, \beta\} = 0, \pi/2$$

wherein $e^m$ is a selection vector of length $N_p/2$, $N_p$ is a total number of CSI-RS antenna ports.

Further to the first example or any other example discussed herein, in a twelfth example, the UE calculate the CSI of the transmission channel using the codebook, wherein the codebook for rank 4 CSI reporting contains at least one element from the following set:

$$\frac{1}{\sqrt{8}}\begin{bmatrix} e^m & e^m & e^k & e^k \\ e^{j\alpha}e^m & -e^{j\alpha}e^m & e^{j\beta}e^k & -e^{j\beta}e^k \end{bmatrix},$$

$$\{m, k\} = 0, \ldots, N_p/2 - 1, m \neq k, \{\alpha, \beta\} = 0, \pi/2$$

wherein $e^m$ is a selection vector of length $N_p/2$, $N_p$ is the total number of CSI-RS antenna ports.

Further to any one of the ninth through the twelfth examples or any other example discussed herein, in a thirteenth example, a value of "1" occupies an $m^{th}$ position of the vector and a value of "0" occupies other positions of the vector.

Further to the fourth example or any other example discussed herein, in a fifteenth example, the UE calculates the CSI of the transmission channel using the codebook, wherein the codebook for rank 2 CSI reporting contains at least one element from the following set:

$$\frac{1}{\sqrt{8}}\begin{bmatrix} d^{m,n} & d^{m,n} \\ e^{j\alpha}d^{m,n} & -e^{j\alpha}d^{m,n} \end{bmatrix}, \{m\} = 0, \ldots, N_p/2 - 1, \{\alpha\} = 0, \pi/2,$$

wherein $d^{m,n}$ is a vector of length $N_p/2$.

Further to the fourth example or any other example discussed herein, in a sixteenth example, the UE calculates the CSI of the transmission channel using the codebook, wherein the codebook for rank 3 CSI reporting contains at least one element from the following set:

$$\frac{1}{\sqrt{12}}\begin{bmatrix} d^{m,n} & d^{m,n} & d^{k,l} \\ e^{j\alpha}d^{m,n} & -e^{j\alpha}d^{m,n} & e^{j\beta}d^{k,l} \end{bmatrix}$$

$$\frac{1}{\sqrt{12}}\begin{bmatrix} d^{m,n} & d^{k,l} & d^{k,l} \\ e^{j\alpha}d^{m,n} & e^{j\beta}d^{k,l} & -e^{j\beta}d^{k,l} \end{bmatrix},$$

$$\{m, n\}, \{k, l\} = 0, \ldots, N_p/2 - 1, m \neq n, k \neq l, \{\alpha, \beta\} = 0, \pi/2$$

wherein $d^{m,n}$ is a vector of length $N_p/2$.

Further to the fourth example or any other example discussed herein, in a seventeenth example, the UE calculates the CSI of the transmission channel using the codebook, wherein the codebook for rank 4 CSI reporting contains at least one element from the following set:

$$\frac{1}{\sqrt{16}}\begin{bmatrix} d^{m,n} & d^{m,n} & d^{k,l} & d^{k,l} \\ e^{j\alpha}d^{m,n} & -e^{j\alpha}d^{m,n} & e^{j\beta}d^{k,l} & -e^{j\beta}d^{k,l} \end{bmatrix},$$

$$\{m, n\}, \{k, l\} = 0, \ldots, N_p/2 - 1, m \neq n, k \neq l, \{\alpha, \beta\} = 0, \pi/2$$

wherein $d^{m,n}$ is a vector of length $N_p/2$

Further to any one of the fourteenth through the seventeenth examples or any other example discussed herein, in a eighteenth example, in vector $d^{m,n}$ a value of "1" occupies an $m^{th}$ position of the vector, a value of "−1" occupies an $n^{th}$ position of the vector, where m is unequal to n, and a value of "0" occupies other positions of the vector.

Further to any one of the fourteenth through the seventeenth examples or any other example discussed herein, in a nineteenth example, in vector $d^{m,n}$, a value of "1" occupies the $m^{th}$ and $n^{th}$ positions of the vector, where m is unequal to n, and a value of "0" occupies the other positions of the vector, or a value of "1" occupies the $m^{th}$ position, a value of "−1" occupies the $n^{th}$ positions of the vector, and a value of "0" occupies other positions of the vector.

Further to any one of the fourteenth through the seventeenth examples or any other example discussed herein, in a twentieth example, in vector $d^{m,n}$ a non-integer value occupies the $m^{th}$ and $n^{th}$ positions, where m is unequal to n, and a value of "0" occupies the other positions.

Further to any one of the fourteenth through the seventeenth examples or any other example discussed herein, in a twenty-first example, the vector, $d^{m,n}$, of length $N_p/2$ includes non-integer values in the $n^{th}$ and $m^{th}$ elements (noted as $d^i$), where m us unequal to n, as follows:

$$d^i = \begin{cases} d_m, & i = m \\ d_n, & i = n \\ 0, & \text{otherwise} \end{cases}$$

wherein m is not equal to n.

Further to the first example or any other example discussed herein, in a twenty-second example, the codebook follows an uplink codebook defined in TS 36.211 v. 11.4.0, section 5.3.3A.2 to support uplink transmissions.

Further, the codebook design method and apparatus 500 can be implemented, in a twenty-third example, by an apparatus to operate in a cellular network, the apparatus comprising a plurality of antennas to receive and transmit signals, a codebook comprising a matrix, the matrix comprising non-constant modulus elements, wherein each column of the matrix corresponds to a multiple-input-multiple-output (MIMO) layer and each row of the matrix corresponds to an antenna port and wherein each precoding vector contains at least two non-zero elements, and baseband circuitry to receive a radio frame comprising a channel state information reference signal (CSI-RS), calculate channel state information (CSI) using both the CSI-RS and the codebook, and report the CSI to the cellular network.

Further to the twenty-third example or any other example discussed herein, in a twenty-fourth example, the codebook comprises a first codebook comprising precoding matrices for rank 1, rank 2, rank 3, and rank 4, the first codebook comprising first selection vectors of length $N_p/2$, where $N_p$ is a total number of CSI-RS antenna ports, wherein a value of "1" occupies an $m^{th}$ position and a value of "0" occupies other positions of the first selection vectors, and a second codebook also comprising precoding matrices for rank 1, rank 2, rank 3, and rank 4, the second codebook comprising second selection vectors of length $N_p/2$, wherein a value of "1" occupies the $m^{th}$ and $n^{th}$ positions of the second selection vectors, where m is unequal to n, and a value of "0" occupies the other positions of the second selection vectors, or a value of "1" occupies the $m^{th}$ position, a value of "−1" occupies the $n^{th}$ positions of the second selection vectors, and a value of "0" occupies other positions of the second selection vectors.

Further, the codebook design method and apparatus 500 can be implemented, in a twenty-fifth example, by machine-readable storage including machine-readable instructions, when executed, to realize an apparatus as claimed in any preceding example.

While the foregoing examples are illustrative of the principles in one or more particular applications, it will be apparent to those of ordinary skill in the art that numerous modifications in form, usage, and details of implementation can be made without the exercise of inventive faculty, and without departing from the principles and concepts herein and will appreciate numerous modifications and variations therefrom. It is intended that the appended claims cover all such modifications and variations as fall within the true spirit and scope of the disclosed embodiments.

We claim:

1. A user equipment (UE) to perform channel estimation of a transmission channel of a wireless cellular network, the UE is configured to:
measure a channel state information reference signal (CSI-RS) of a downlink signal received on the transmission channel;
calculate channel state information (CSI) of the transmission channel using a codebook along with the CSI-RS, the codebook comprising a plurality of precoding matrices, the codebook further comprising non-constant modulus elements with at least two non-zero elements in a precoding vector among a plurality of vectors of the codebook; and
report the CSI of the transmission channel by way of an uplink transmission.

2. The UE of claim 1, the UE to further:
calculate the CSI of the transmission channel using a precoding matrix of the codebook, wherein each vector of the precoding matrix comprises a concatenation at least two selection vectors and each selection vector comprises a single non-zero element and remaining zero elements.

3. The UE of claim 2, the UE to further:
calculate the CSI of the transmission channel using the precoding matrix of the codebook, wherein the single non-zero element in the selection vector has a first amplitude and a first phase and a second non-zero element has the first amplitude and a second phase, wherein the first phase differs from the second phase by 0, π/2, 2π/2, or 3π/2.

4. The UE of claim 1, the UE to further:
calculate the CSI of the transmission channel using a precoding matrix of the codebook, wherein each vector of the precoding matrix comprises a concatenation of at least two selection vectors and each selection vector comprises a first non-zero element, a second non-zero element, and remaining zero elements.

5. The UE of claim 4, wherein the first and second non-zero element in a first selection vector has a first amplitude and the first and second non-zero element in a second selection vector has a second amplitude and a second phase, wherein a first phase differs from the second phase by 0, π/2, π, or 3π/4.

6. The UE of claim 4, wherein the first non-zero element in the selection vector has a first amplitude and a first phase and the second non-zero element has the first amplitude and a second phase, wherein the first phase differs from the second phase by 0 or π.

7. The UE of claim 1, the UE to further:
calculate the CSI of the transmission channel using the codebook, wherein each of the plurality of matrices in the codebook comprises vectors in which each vector comprises four non-zero elements and remaining zero elements.

8. The UE of claim 4, wherein the first non-zero element has a first amplitude and a first phase and the second non-zero element has the first amplitude and a second phase, wherein the first phase differs from the second phase by 0, π/2, π, or 3π/2.

9. The UE of claim 1, the UE to further:
calculate the CSI of the transmission channel using the codebook, wherein the codebook for rank 1 CSI reporting contains at least one element from the following set of the vectors:

$$\frac{1}{\sqrt{2}}\begin{bmatrix} e^m \\ e^{j\alpha}e^m \end{bmatrix}, \frac{1}{\sqrt{2}}\begin{bmatrix} e^m \\ -e^{j\alpha}e^m \end{bmatrix}, \{m\} = 0, \ldots, N_p/2-1, \{\alpha\} = 0, \pi/2,$$

wherein $e^m$ is a selection vector of length $N_p/2$, $N_p$ is a total number of CSI-RS antenna ports.

10. The UE of claim 1, the UE to further:
calculate the CSI of the transmission channel using the codebook, wherein the codebook for rank 2 CSI reporting contains at least one element from the following set:

$$\frac{1}{\sqrt{4}}\begin{bmatrix} e^m & e^m \\ e^{j\alpha}e^m & -e^{j\alpha}e^m \end{bmatrix}, \{m\} = 0, \ldots, N_p/2 - 1, \{\alpha\} = 0, \pi/2,$$

wherein $e^m$ is a selection vector of length $N_p/2$, $N_p$ is a total number of CSI-RS antenna ports.

11. The UE of claim 1, the UE to further:
calculate the CSI of the transmission channel using the codebook, wherein the codebook for rank 3 CSI reporting contains at least one element from the following set:

$$\frac{1}{\sqrt{16}}\begin{bmatrix} e^m & e^m & e^k \\ e^{j\alpha}e^m & -e^{j\alpha}e^m & e^{j\beta}e^k \end{bmatrix},$$

$$\frac{1}{\sqrt{16}}\begin{bmatrix} e^m & e^k & e^k \\ e^{j\alpha}e^m & e^{j\beta}e^k & -e^{j\beta}e^k \end{bmatrix},$$

$\{m, k\} = 0, \ldots, N_p/2 - 1, m \neq k, \{\alpha, \beta\} = 0, \pi/2$ wherein $e^m$ is a selection vector of length $N_p/2$, $N_p$ is a total number of CSI-RS antenna ports.

12. The UE of claim 1, the UE to further:
calculate the CSI of the transmission channel using the codebook, wherein the codebook for rank 4 CSI reporting contains at least one element from the following set:

$$\frac{1}{\sqrt{8}}\begin{bmatrix} e^m & e^m & e^k & e^k \\ e^{j\alpha}e^m & -e^{j\alpha}e^m & e^{j\beta}e^k & -e^{j\beta}e^k \end{bmatrix},$$

$\{m, k\} = 0, \ldots, N_p/2 - 1, m \neq k, \{\alpha, \beta\} = 0, \pi/2$ wherein $e^m$ is a selection vector of length $N_p/2$, $N_p$ is a total number of CSI-RS antenna ports.

13. The UE of claim 9, wherein a value of "1" occupies an $m^{th}$ position of the vector and a value of "0" occupies other positions of the vector.

14. The UE of claim 4, the UE to further:
calculate the CSI of the transmission channel using the codebook, wherein the codebook for rank 1 CSI reporting contains at least one element from the following set:

$$\frac{1}{\sqrt{4}}\begin{bmatrix} d^{m,n} \\ e^{j\alpha}d^{m,n} \end{bmatrix}, \frac{1}{\sqrt{4}}\begin{bmatrix} d^{m,n} \\ -e^{j\alpha}d^{m,n} \end{bmatrix},$$

$\{m, n\} = 0, \ldots, N_p/2 - 1, m \neq n, \{\alpha\} = 0, \pi/2$ wherein $d^{m,n}$ is a vector of length $N_p/2$.

15. The UE of claim 4, the UE to further:
calculate the CSI of the transmission channel using the codebook, wherein the codebook for rank 2 CSI reporting contains at least one element from the following set:

$$\frac{1}{\sqrt{8}}\begin{bmatrix} d^{m,n} & d^{m,n} \\ e^{j\alpha}d^{m,n} & -e^{j\alpha}d^{m,n} \end{bmatrix},$$

$\{m\} = 0, \ldots, N_p/2 - 1, \{\alpha\} = 0, \pi/2,$ wherein $d^{m,n}$ is a vector of length $N_p/2$.

16. The UE of claim 4, the UE to further:
calculate the CSI of the transmission channel using the codebook, wherein the codebook for rank 3 CSI reporting contains at least one element from the following set:

$$\frac{1}{\sqrt{12}}\begin{bmatrix} d^{m,n} & d^{m,n} & d^{k,l} \\ e^{j\alpha}d^{m,n} & -e^{j\alpha}d^{m,n} & e^{j\beta}d^{k,l} \end{bmatrix},$$

$$\frac{1}{\sqrt{12}}\begin{bmatrix} d^{m,n} & d^{k,l} & d^{k,l} \\ e^{j\alpha}d^{m,n} & e^{j\beta}d^{k,l} & -e^{j\beta}d^{k,l} \end{bmatrix},$$

$\{m, n\}, \{k, l\} = 0, \ldots, N_p/2 - 1, m \neq n, k \neq l, \{\alpha, \beta\} = 0, \pi/2$ wherein $d^{m,n}$ is a vector of length $N_p/2$.

17. The UE of claim 4, the UE to further:
calculate the CSI of the transmission channel using the codebook, wherein the codebook for rank 4 CSI reporting contains at least one element from the following set:

$$\frac{1}{\sqrt{16}}\begin{bmatrix} d^{m,n} & d^{m,n} & d^{k,l} & d^{k,l} \\ e^{j\alpha}d^{m,n} & -e^{j\alpha}d^{m,n} & e^{j\beta}d^{k,l} & -e^{j\beta}d^{k,l} \end{bmatrix},$$

$\{m, n\}, \{k, l\} = 0, \ldots, N_p/2 - 1, m \neq n, k \neq l, \{\alpha, \beta\} = 0, \pi/2$ wherein $d^{m,n}$ is a vector of length $N_p/2$.

18. The UE of claim 14, wherein in vector $d^{m,n}$ a value of "1" occupies an $m^{th}$ position of the vector, a value of "−1" occupies an $n^{th}$ position of the vector, where m is unequal to n, and a value of "0" occupies other positions of the vector.

19. The UE of claim 14, wherein in vector $d^{m,n}$:
a value of "1" occupies the $m^{th}$ and $n^{th}$ positions of the vector, where m is unequal to n, and a value of "0" occupies the other positions of the vector; or
a value of "1" occupies the $m^{th}$ position, a value of "−1" occupies the $n^{th}$ positions of the vector, and a value of "0" occupies other positions of the vector.

20. The UE of claim 14, wherein in vector $d^{m,n}$ a non-integer value occupies the $m^{th}$ and $n^{th}$ positions, where m is unequal to n, and a value of "0" occupies the other positions.

21. The UE of claim 14, wherein the vector $d^{m,n}$ of length $N_p/2$ includes non-integer values in the $n^{th}$ and $m^{th}$ elements (noted as $d^i$), where m is unequal to n, as follows:

$$d^i = \begin{cases} d_m, & i = m \\ d_n, & i = n \\ 0, & \text{otherwise} \end{cases}$$

wherein m is not equal to n.

22. The UE of claim 1, wherein the codebook follows an uplink codebook defined in TS 36.211 v. 11.4.0, section 5.3.3A.2 to support uplink transmissions.

23. An apparatus to operate in a cellular' network, the apparatus comprising:
- a plurality of antennas to receive and transmit signals;
- a codebook comprising a matrix, the matrix comprising non-constant modulus elements, wherein a column of the matrix corresponds to a multiple-input-multiple-output (MIMO) layer and a row of the matrix corresponds to an antenna port and wherein a precoding vector among a plurality of vectors of the codebook contains at least two non-zero elements; and
- baseband circuitry is configured to:
  - receive a radio frame comprising a channel state information reference signal (CSI-RS);
  - calculate channel state information (CSI) using both the CSI-RS and the codebook; and
  - report the CSI to the cellular network.

24. The apparatus of claim 23, wherein the codebook comprises:
- a first codebook comprising precoding matrices for rank 1, rank 2, rank 3, and rank 4, the first codebook comprising first selection vectors of length $N_p/2$, where $N_p$ is a total number of CSI-RS antenna ports, wherein a value of "1" occupies an $m^{th}$ position and a value of "0" occupies other positions of the first selection vectors; and
- a second codebook also comprising precoding matrices for rank 1, rank 2, rank 3, and rank 4, the second codebook comprising second selection vectors of length $N_p/2$, wherein:
  - a value of "1" occupies $n^{th}$ and $m^{th}$ positions of the second selection vectors, where m is unequal to n, and a value of "0" occupies the other positions of the second selection vectors; or
  - a value of "1" occupies the $m^{th}$ position, a value of "−1" occupies the $n^{th}$ positions of the second selection vectors, and a value of "0" occupies other positions of the second selection vectors.

* * * * *